US010899307B2

(12) United States Patent
Lin et al.

(10) Patent No.: US 10,899,307 B2
(45) Date of Patent: Jan. 26, 2021

(54) DEPLOYABLE HEADREST AIRBAG

(71) Applicant: GM Global Technology Operations LLC, Detroit, MI (US)

(72) Inventors: Chin-Hsu Lin, Troy, MI (US); Yi-Pen Cheng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 16/195,091

(22) Filed: Nov. 19, 2018

(65) Prior Publication Data

US 2020/0156586 A1    May 21, 2020

(51) Int. Cl.
| | |
|---|---|
| *B60R 21/233* | (2006.01) |
| *B60R 21/207* | (2006.01) |
| *B60N 2/80* | (2018.01) |
| *B60R 21/013* | (2006.01) |
| *B60R 21/015* | (2006.01) |
| *B60N 2/00* | (2006.01) |
| *B60R 21/00* | (2006.01) |

(52) U.S. Cl.
CPC ............ *B60R 21/233* (2013.01); *B60N 2/002* (2013.01); *B60N 2/80* (2018.02); *B60R 21/013* (2013.01); *B60R 21/01552* (2014.10); *B60R 21/207* (2013.01); *B60R 2021/0032* (2013.01); *B60R 2021/0048* (2013.01); *B60R 2021/2074* (2013.01)

(58) Field of Classification Search
CPC ... B60R 21/233; B60R 21/207; B60R 21/013; B60R 21/01552; B60R 21/01538; B60R 21/231; B60R 21/015; B60R 2021/2074; B60R 2021/0048; B60R 2021/0032; B60R 2011/0017; B60N 2/80; B60N 2/002; B60N 2/48
USPC ....... 280/729, 730.1, 743.1; 297/216.12, 391
See application file for complete search history.

(56) References Cited

U.S. PATENT DOCUMENTS

| | | | |
|---|---|---|---|
| 2004/0075252 A1* | 4/2004 | Pan ................... | B60R 21/01542 280/730.1 |
| 2017/0136977 A1* | 5/2017 | Ohno ................... | B60R 21/237 |
| 2017/0334385 A1 | 11/2017 | Sakakibara et al. | |

FOREIGN PATENT DOCUMENTS

EP    1632407 A2 *   3/2006   ....... B60R 21/01552

OTHER PUBLICATIONS https://hovding.com, accessed Oct 1, 2018; The New Bicycle Helmet.

* cited by examiner

*Primary Examiner* — Keith J Frisby
(74) *Attorney, Agent, or Firm* — Quinn IP Law

(57) ABSTRACT

A deployable headrest airbag includes an airbag chamber configured to be coupled to a headrest of a vehicle seat. The airbag chamber has a stowed position and a deployed position. In stowed position, the airbag chamber is disposed inside the headrest. In the deployed position, the deployable headrest airbag is disposed outside of the headrest to protect a head and a neck of a vehicle occupant.

14 Claims, 7 Drawing Sheets

DEPLOYABLE HEADREST AIRBAG

INTRODUCTION

The present disclosure generally relates to airbags, and more particularly, a deployable headrest airbag to protect a vehicle occupant's head and neck.

Some vehicles have airbags designed separately for frontal, side, and rear protection. In other words, the vehicle may include several airbags that protect a vehicle occupant depending on the direction of the external force applied to the vehicle.

SUMMARY

The presently disclosed deployable headrest airbag is configured to protect the occupant's head and neck from omni-directional external forces, and is ideal for an autonomous vehicle (AV) swivel seat design. The headrest height may be automatically adjusted based on the occupant biometric data, such that the headrest airbag will be deployed when the occupant's head is at close proximity to the headrest. With the headrest airbag, the roof rail airbag may not be needed. When oblique rear external forces are applied to the vehicle, the occupant's head may be contained and will not slip off the headrest.

The deployable headrest airbag is configured to protect the occupant's head and neck protections from omni-directional external forces. The airbag is mounted inside the headrest, and it may deploy from the top of the headrest or the back of the headrest to fit onto a seated or reclined occupant. The airbag is designed such that it will hook forward and downward to cover the occupant's head. The headrest height may be automatically adjusted based on the occupant's head position using the available sensors and will pull the occupant closer to headrest proximity by tightening the shoulder belt.

In some embodiments, the deployable headrest airbag includes an airbag chamber configured to be coupled to a headrest of a vehicle seat. The airbag chamber has a stowed position and a deployed position. In stowed position, the airbag chamber is disposed inside the headrest. In the deployed position, the deployable headrest airbag is disposed outside of the headrest to protect a head and a neck of a vehicle occupant.

The airbag chamber may be a first airbag chamber, and upon deployment of the deployable headrest airbag, the first airbag chamber is positioned adjacent the headrest to protect an occiput of the vehicle occupant. The deployable headrest airbag may further include a second airbag chamber and a third airbag chamber. The first airbag chamber is in fluid communication with the second airbag chamber and the third airbag chamber to allow fluid flow from the first airbag chamber simultaneously to the second airbag chamber and the third airbag chamber upon deployment of the deployable headrest airbag. The first airbag chamber may be closer to the headrest of the vehicle seat than the second airbag chamber and the third airbag chamber.

The deployable headrest airbag may further include a fourth airbag chamber in fluid communication with the second airbag chamber to allow fluid flow from the second airbag chamber directly to the fourth airbag chamber upon deployment of the deployable headrest airbag. The second airbag chamber has a curved tubular shape upon deployment of the deployable headrest airbag to move the deployable headrest airbag in a first direction and a second direction upon deployment of the deployable headrest airbag in order to protect the head and the neck of the vehicle occupant, and the first direction is perpendicular to the second direction.

The deployable headrest airbag may further include a fifth airbag chamber in fluid communication with the third airbag chamber to allow fluid flow from the third airbag chamber directly to the fifth airbag chamber upon deployment of the deployable headrest airbag.

Each of the fourth airbag chamber and the fifth airbag chamber may serve as a sidewall of the deployable headrest airbag upon deployment of the deployable headrest airbag to protect a temporal bone of the vehicle occupant. The fourth airbag chamber may be spaced apart from the fifth airbag chamber along a third direction upon deployment of the deployable headrest airbag.

The deployable headrest airbag may further include a sixth airbag chamber in fluid communication with the second airbag chamber and the third airbag chamber to allow fluid flow from the second airbag chamber and the third airbag chamber directly to the sixth airbag chamber upon deployment of the deployable headrest airbag. The sixth airbag chamber may be disposed between the second airbag chamber and the third airbag chamber to protect a frontal bone and a nasal bone of the vehicle occupant. The sixth airbag chamber may have a curved portion upon deployment of the deployable headrest airbag to protect the frontal bone and the nasal bone of the vehicle occupant.

The deployable headrest airbag may further include a seventh airbag chamber in fluid communication with the first airbag chamber to allow fluid flow from the first airbag chamber directly to the seventh airbag chamber. The seventh airbag chamber may be disposed between the second airbag chamber and the third airbag chamber and between the sixth airbag chamber and the first airbag chamber to protect a parietal bone of the vehicle occupant.

The present disclosure also describes a vehicle seat assembly including a vehicle seat including a seat base, a seatback coupled to the seat base, and a headrest coupled to the seatback. The vehicle seat assembly further includes a deployable headrest airbag coupled to the headrest and as described above.

The present disclosure also describes a vehicle including a vehicle body and a vehicle floor coupled to the vehicle body. The vehicle body and the vehicle floor collectively define a passenger compartment. The vehicle further includes a vehicle seat disposed inside the passenger compartment. The vehicle seat is rotatably coupled to the vehicle floor and includes a headrest. The vehicle further includes a first sensor coupled to the vehicle body. The first sensor is configured to detect an external force exerted on the vehicle body. The vehicle further includes a second sensor coupled to the vehicle seat. The second sensor is configured to determine whether a vehicle occupant is seated on the vehicle seat. The vehicle further includes a controller in communication with the first sensor and the second sensor and a sensing system in communication with the controller. The sensing system is configured to locate a position of a head of the vehicle occupant. The vehicle further includes a deployable headrest airbag as described above. The controller is in communication with the deployable headrest airbag and is programmed to: detect that the vehicle occupant is seated on the vehicle seat; in response to detecting that the detect that the vehicle occupant is seated on the vehicle seat, activate the sensing system to locate the position of the head of the vehicle occupant; determine that the head of the vehicle occupant is in a predetermined position relative to the headrest; detecting that the external force is applied to the vehicle body; in response to determining that the head of the vehicle occupant is in a predetermined position relative to the headrest and detecting that the external force is applied to the vehicle body; and command the deployable headrest airbag to deploy.

The above features and advantages and other features and advantages of the present disclosure are readily apparent from the following detailed description of the best modes for carrying out the disclosure when taken in connection with the accompanying drawings.

DETAILED DESCRIPTION

Figure 1:
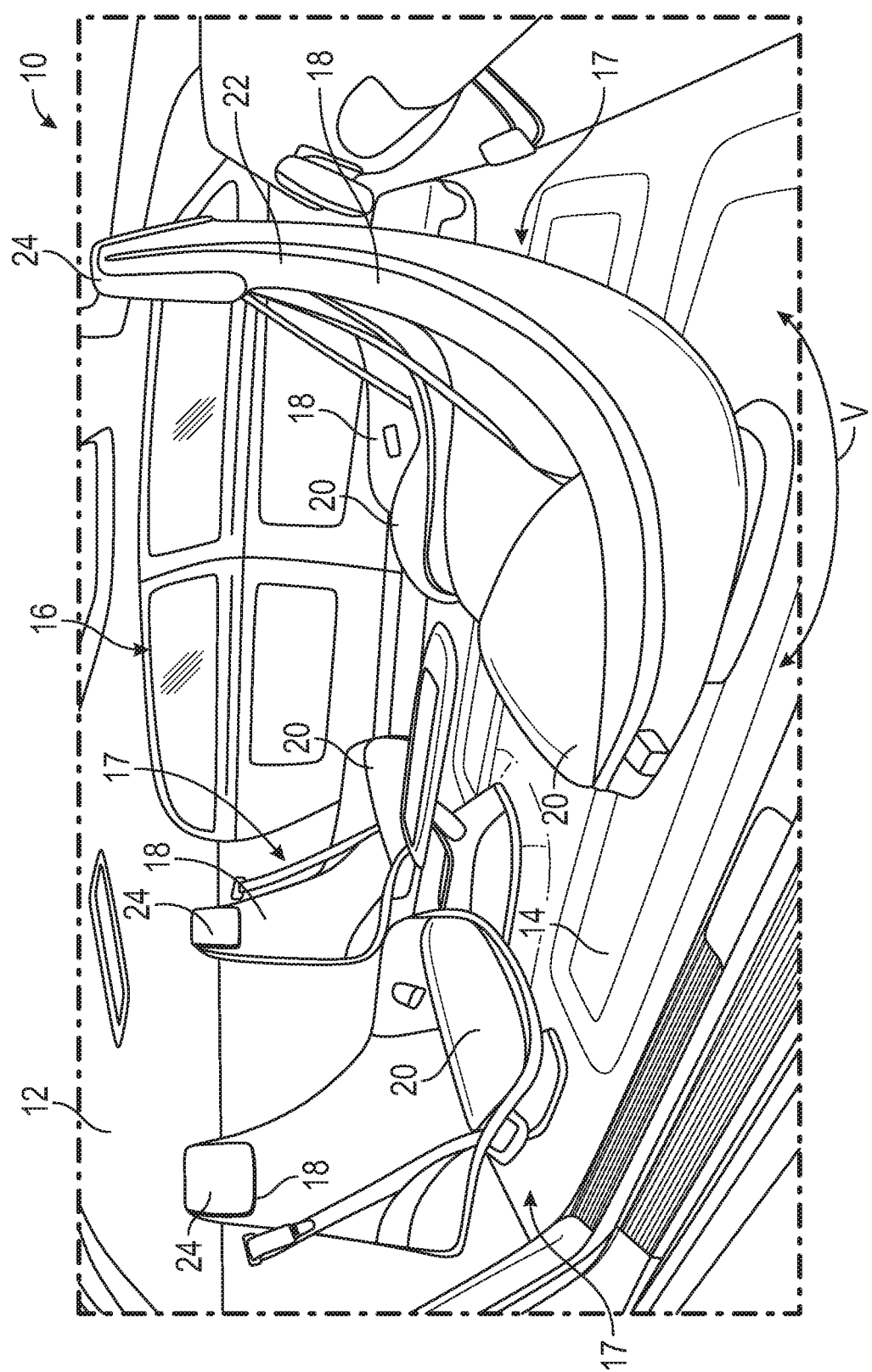
FIG. 1 is a schematic perspective view of an interior portion of a vehicle.
Figure 2:
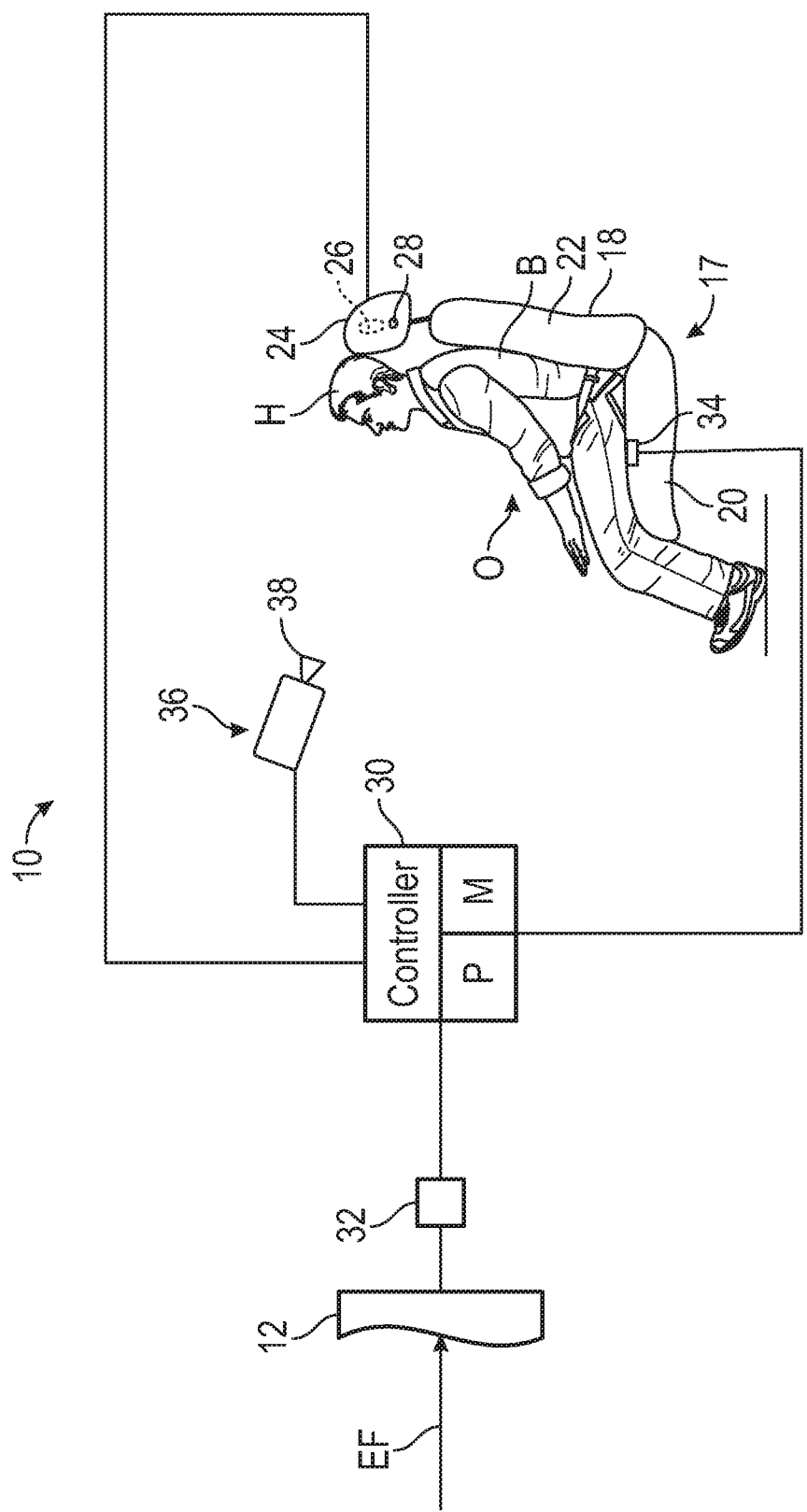
FIG. 2 is a schematic diagram of the vehicle of FIG. 1, depicting, among other things, a vehicle seat assembly, a controller, a first sensor, a second sensor, and a sensing system.
Figure 3:
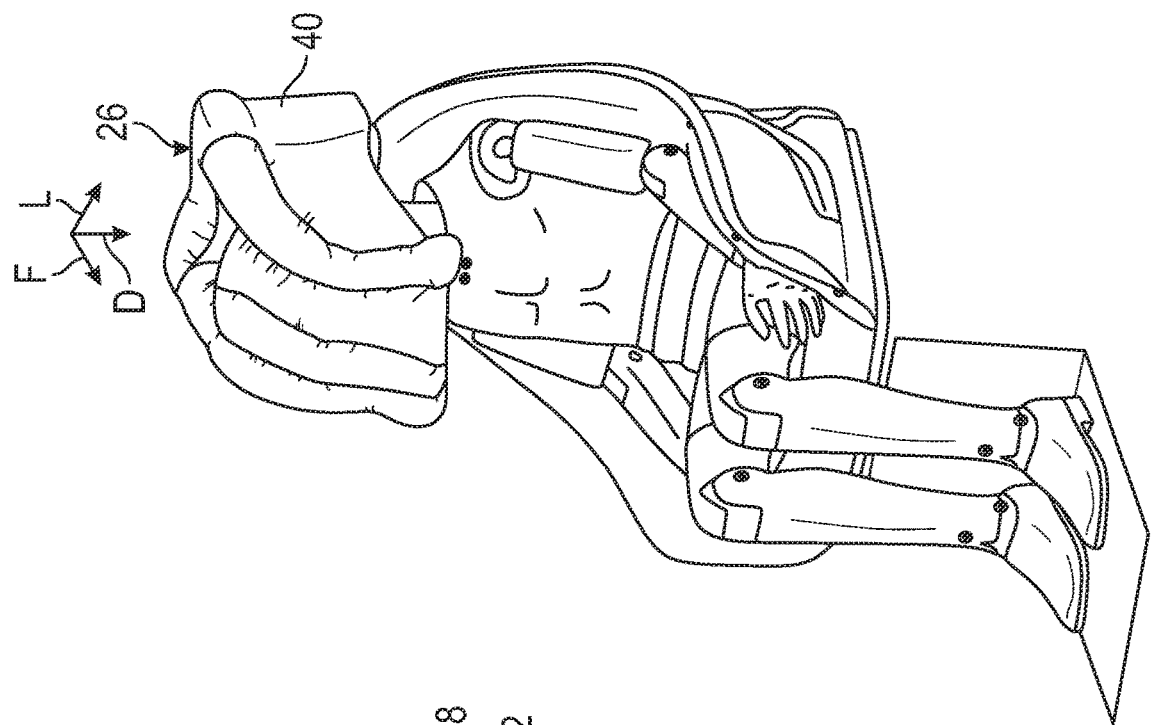
FIG. 3 is a schematic perspective view of a vehicle seat assembly of the vehicle of FIG. 1, with the deployable headrest airbag in the stowed position.

With reference to FIGS. 1 and 2, a vehicle 10 includes a vehicle body 12 and a vehicle floor 14 coupled to the vehicle body 12. The vehicle body 12 and the vehicle floor 14 collectively define a passenger compartment 16. The vehicle 10 further includes one or more vehicle seats 18 disposed inside the passenger compartment 16. In the depicted embodiment, the vehicle 10 is an autonomous vehicle and the vehicle seats 18 are therefore arranged in a "campfire" setting facing each other. One or more of the vehicle seats 18 are rotatably coupled to vehicle floor 14. Consequently, the vehicle seats 18 are configured to swivel relative to the vehicle floor 14 as indicated by double arrow V. Each vehicle seat 18 includes a seat base 20 configured to bear the weight of a vehicle occupant O, a seatback 22 coupled to the seat base 20, and a headrest 24 coupled to the seatback 22.

The seatback 22 is configured to support the back B of the vehicle occupant O. The headrest 24 is configured to support the head H of the vehicle occupant O.

With specific reference to FIG. 2, the vehicle seat 18 is part of a vehicle seat assembly 17 that also includes a deployable headrest airbag 26. The deployable headrest airbag 26 may be entirely disposed inside the headrest 24 in its stowed position. In its deployed position, the deployable headrest airbag 26 is at least partially disposed outside the headrest 24 to protect the head H of the vehicle occupant O when the vehicle body 12 is subjected to an external force EF. The deployable headrest airbag 26 includes an initiator 28 to inflate the deployable headrest airbag 26 when the vehicle body 12 is subjected to the external force EF. The initiator 28 may be a pyrotechnic device configured to inflate the deployable headrest airbag 26.

The vehicle 10 further includes one or more controllers 30 for, among other things, controlling the operation of the deployable headrest airbag 26. The controller 30 is therefore in communication with the deployable headrest airbag 26 and is programmed to send commands to the deployable headrest airbag 26. The term "controller" means a physical device including hardware elements such as a processor (P), circuitry including but not limited to a timer, oscillator, analog-to-digital (A/D) circuitry, digital-to-analog (D/A) circuitry, a digital signal processor, and input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random-access memory (RAM), electrically-erasable programmable read-only memory (EEPROM), and the like. The methods described in the present disclosure may be recorded in memory (M) and executed by the processor (P) in the overall control of the deployable headrest airbag 26.

The vehicle 10 further includes a first sensor 32 coupled to the vehicle body 12. The first sensor 32 is configured to detect the external force EF exerted on the vehicle body 12. The first sensor 32 may include an accelerometer to indirectly measure the magnitude of the external force EF by measuring the magnitude of the deceleration of the vehicle 10 when it is subjected to the external force EF. The controller 30 is programmed to command the deployable headrest airbag 26 to deploy when the deceleration of the vehicle 10 is greater than a predetermined deceleration threshold (as measured by the first sensor 32). Specifically, in response to determining that the deceleration of the vehicle is greater than the predetermined deceleration threshold, the controller 30 commands the initiator 28 to inflate the deployable headrest airbag 26 to protect the head H of the vehicle occupant O. In addition to the accelerometer, the first sensor 32 may include a gyro to determine the direction of the external force EF.

The vehicle 10 further includes a second sensor 34 coupled to the vehicle seat 18. In particular, the second sensor 34 may be directly coupled to the seat base 20 and is configured to configured to determine whether the vehicle occupant O is seated on the vehicle seat 18. To do so, for example, the second sensor 34 may be a pressure sensor that detects when pressure is exerted on the seat base 20 by the vehicle occupant O. The second sensor 34 is in communication with the controller 30 and the controller 30 is therefore programmed to receive signals from the second sensor 34. Based on the signals received from the second sensor 34, the controller 30 is programmed to determine whether the vehicle occupant O is seated on the vehicle seat 18. When the external force EF is exerted on the vehicle body 12, the controller 30 is programmed to deploy the deployable headrest airbag 26 solely when the vehicle occupant O is seated on the vehicle seat 18.

The vehicle 10 further includes a sensing system 36 in communication with the controller 30. The sensing system 36 is configured to locate the position of the head H of the vehicle occupant O with respect to the headrest 24. To do so, the sensing system 36 may include a camera 38 configured to capture images of the head H of the vehicle occupant O, who is seated on the vehicle seat 18. The sensing system 36 is configured to generate image data based on the captured images and send the image data to the controller 30. Based on the image data received from the sensing system 36, the controller 30 is programmed to determine the position of the head H of the vehicle occupant O with respect to the headrest 24. When the vehicle body 12 is subjected to the external force EF, the controller 30 commands the deployable headrest airbag 26 to deploy solely when the head H of the vehicle occupant O is in one or more predetermined head positions relative to the headrest 24. In other words, When the vehicle body 12 is subjected to the external force EF, the controller 30 commands the deployable headrest airbag 26 to deploy solely when the head H of the vehicle occupant O is in close proximity to the headrest 24.

Figure 4:
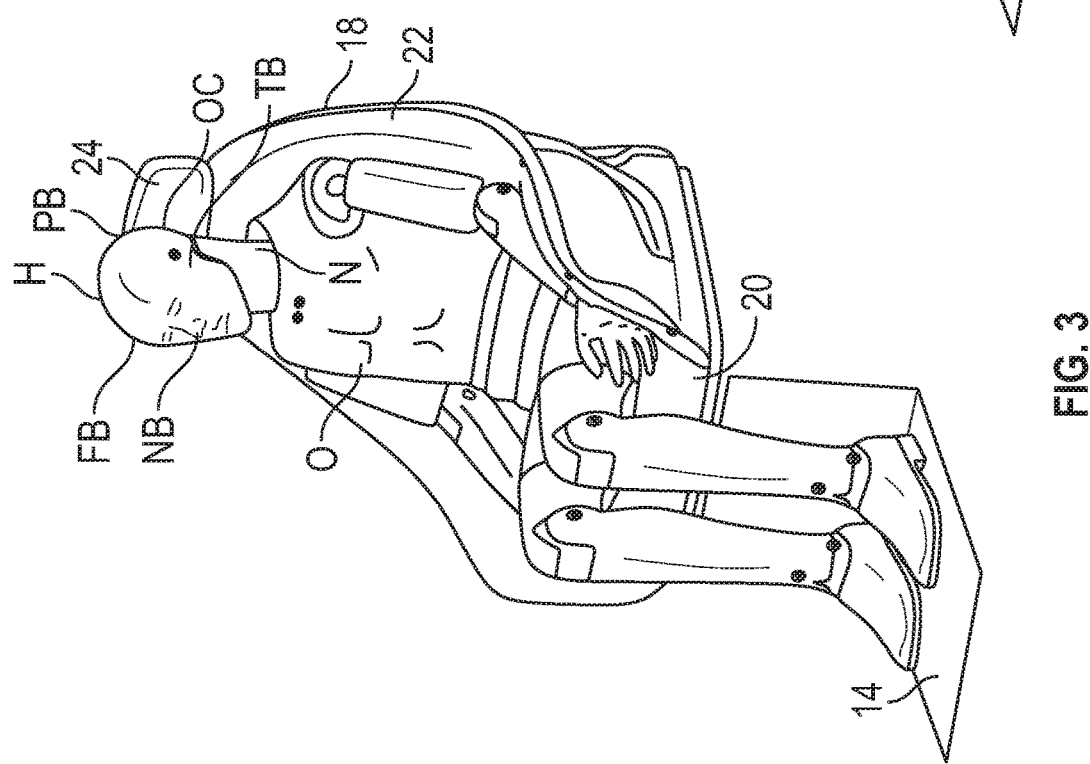
FIG. 4 is a schematic perspective view of the vehicle seat assembly of FIG. 3, with the deployable headrest airbag in the deployed position.
Figure 7:
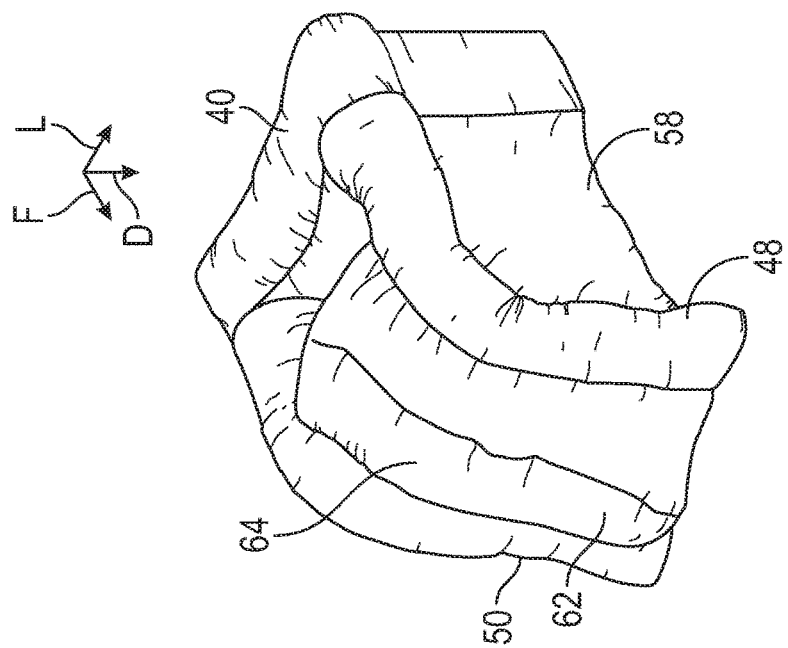
FIG. 7 is a schematic right perspective view of the first airbag chamber, the second airbag chamber, the third airbag chamber, a fourth airbag chamber, a fifth airbag chamber, and a sixth airbag chamber of the FIG. 4.
Figure 6:
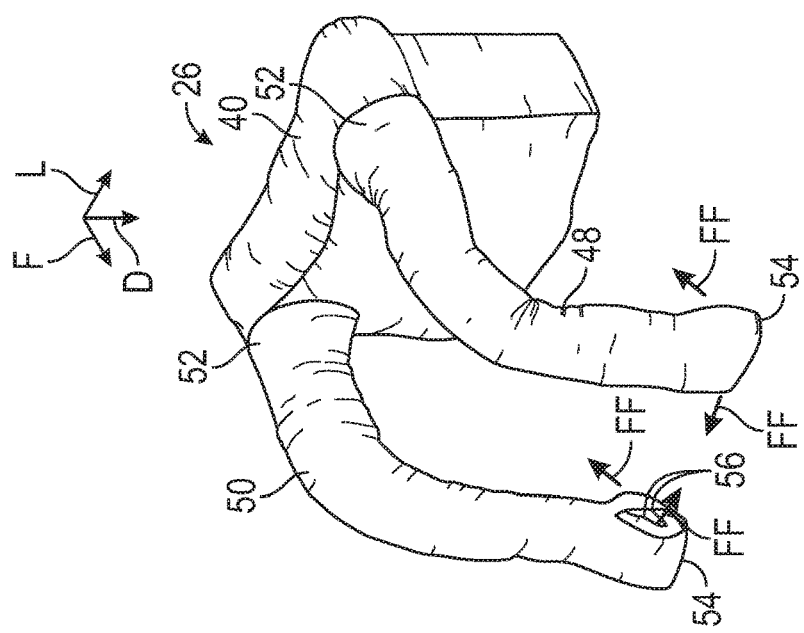
FIG. 6 is a schematic perspective view of the first airbag chamber, a second airbag chamber, and a third airbag chamber of the deployable headrest airbag of FIG. 4.
Figure 5:
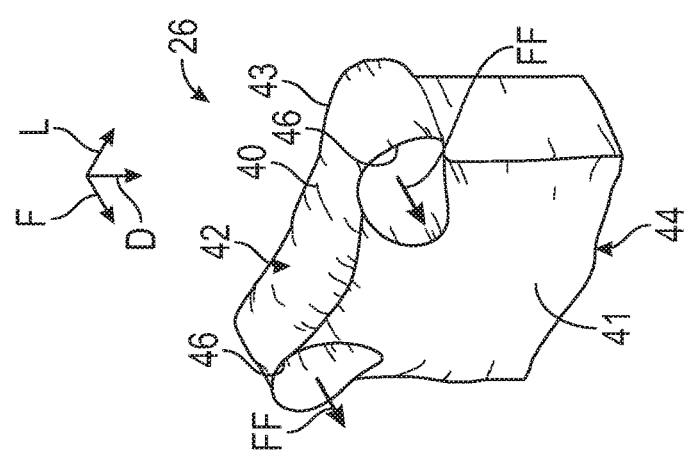
FIG. 5 is a schematic perspective view of a first airbag chamber of the deployable headrest airbag of FIG. 4.
Figure 8:
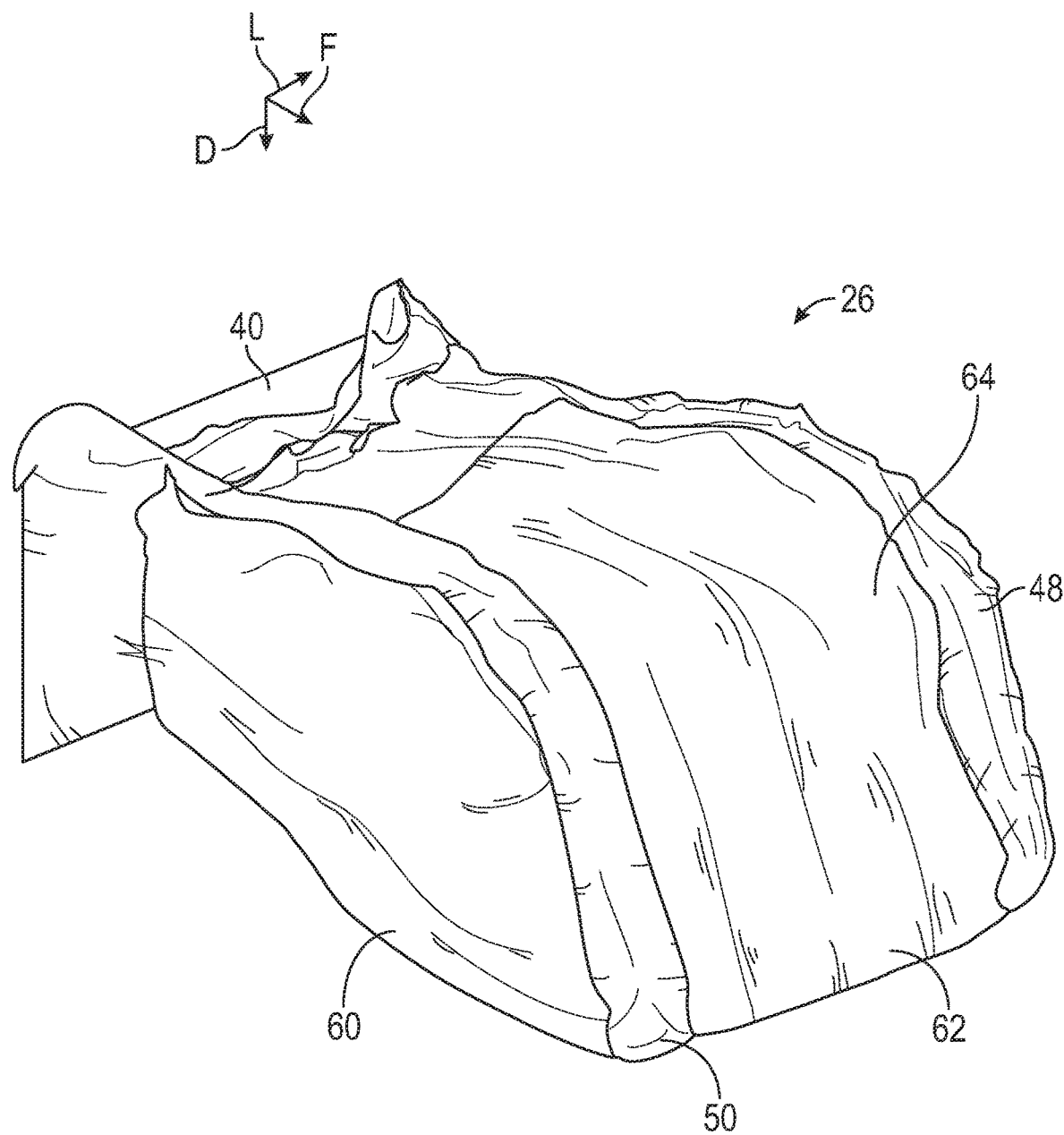
FIG. 8 is a schematic left perspective view of the deployable headrest airbag of FIG. 4.

With regard to FIGS. 3-8, the deployable headrest airbag 26 has a stowed position (FIG. 3) and a deployed position (FIG. 4). In the deployed position, the deployable headrest airbag 26 protects the head H of the vehicle occupant O when the external force EF (FIG. 2) is exerted on the vehicle body 12. The deployable headrest airbag 26 includes a first airbag chamber 40 positioned adjacent the headrest 24 to protect an occiput OC of the vehicle occupant O. As shown in FIG. 5, the first airbag chamber 40 includes a top wall 42 and a bottom wall 44 opposite to the top wall 42. The bottom wall 44 is spaced apart from the top wall 42 along a second direction D (i.e., a downward direction). The first airbag chamber 40 defines one or more top openings 46 to direct fluid flow FF (e.g., airflow) from the first airbag chamber 40 (directly and simultaneously) to a second airbag chamber 48 and a third airbag chamber 50. The top openings 46 are closer to the top wall 42 than to the bottom wall 44 to move the deployable headrest airbag 26 forward and downward during deployment, thereby protecting the head H of the vehicle occupant O. The first airbag chamber 40 further includes a front wall 41 and a rear wall 43 opposite the front wall 41. The front wall 41 is spaced apart from the rear wall 43 along a second direction F (i.e., forward direction). The second direction F is perpendicular to the second direction D. The top openings 46 are defined on the front wall 41 of the first airbag chamber 40 to allow the deployable headrest airbag 26 to deploy in a second direction F (i.e., a forward direction) to protect the head H of the vehicle occupant O. In the depicted embodiment, the first airbag chamber 40 defines two top openings 46 spaced apart along a third direction L (i.e., a lateral direction) to protect the sides of the head H of the vehicle occupant O. The third direction L is perpendicular to the second direction D and the second direction F. The first airbag chamber 40 may have a substantially rectangular cuboid shape to protect the occiput OC of the vehicle occupant O upon deployment of the deployable headrest airbag 26. During deployment of the deployable headrest airbag 26, the first airbag chamber 40 is filled (with fluid) first before other chambers.

The deployable headrest airbag 26 further includes a second airbag chamber 48 and a third airbag chamber 50 in fluid communication with the first airbag chamber 40 to allow fluid flow FF from the first airbag chamber 40 directly and simultaneously to the second airbag chamber 48 and the third airbag chamber 50 upon deployment of the deployable headrest airbag 26. The first airbag chamber 40 is closer to the headrest 24 of the vehicle seat 18 than the second airbag chamber 48 and the third airbag chamber 50. The second airbag chamber 48 and the third airbag chamber 50 are directly connected to the two top openings 46 and are therefore spaced apart from each other along the third direction L (i.e., the lateral direction). Each of the second airbag chamber 48 and the third airbag chamber 50 has a curved tubular shape upon deployment of the deployable headrest airbag 26 to move the deployable headrest airbag 26 in a first direction F (i.e., forward) and the second direction D (i.e., downward) to protect the head H and a neck N of the vehicle occupant O. Each of the second airbag chamber 48 and the third airbag chamber 50 has a first terminal end 52 and a second terminal end 54 opposite the first terminal end 52. The first terminal end 52 of each of the second airbag chamber 48 and the third airbag chamber 50 is directly connected to the first airbag chamber 40, whereas the second terminal end 54 is spaced apart from the first airbag chamber 40 along the second direction D and the first direction F to allow the deployable headrest airbag 26 to move forward and downward during deployment, thereby protecting the head H and the neck N of the vehicle occupant O. Each of the second airbag chamber 48 and the third airbag chamber 50 define bottom openings 56 at its second terminal end 54 to allow fluid flow FF from: (a) the second airbag chamber 48 directly to a fourth airbag chamber 58; (b) the third airbag chamber 50 directly to a fifth airbag chamber 60; and (c) the second airbag chamber 48 and the third airbag chamber 50 directly to a sixth airbag chamber 62. Each of the second airbag chamber 48 and the third airbag chamber 50 are wholly or partly made of a fabric material to allow the second airbag chamber 48 and the third airbag chamber 50 to freely deploy forward and downward.

The deployable headrest airbag 26 further includes the fourth airbag chamber 58, which is solely in direct fluid communication with the second airbag chamber 48 to allow fluid flow from the second airbag chamber 48 directly to the fourth airbag chamber 58 upon deployment of the deployable headrest airbag 26. The deployable headrest airbag 26 further includes a fifth airbag chamber 60 in direct fluid communication with the third airbag chamber 50 to allow fluid flow from the third airbag chamber 50 directly to the fifth airbag chamber 60 upon deployment of the deployable headrest airbag 26. Each of the fourth airbag chamber 58 and the fifth airbag chamber 60 serves as a sidewall of the deployable headrest airbag 26 upon deployment of the deployable headrest airbag to protect a temporal bone TB of the vehicle occupant O, thereby protecting the head H and the neck N from bending when the external force EF is exerted on the side of the vehicle body 12. The deployable headrest airbag 26 may replace the roof rail airbag and the front center airbag to avoid vehicle occupant O interaction when the external force EF is exerted on the vehicle body 12. The fourth airbag chamber 58 is spaced apart from the fifth airbag chamber 60 along the third direction L upon deployment of the deployable headrest airbag 26.

The deployable headrest airbag 26 further has a sixth airbag chamber 62 in direct fluid communication with the second airbag chamber 48 and the third airbag chamber 50 (via the bottom openings 56) to allow fluid flow FF from the second airbag chamber 48 and the third airbag chamber 50 directly to the sixth airbag chamber 62 upon deployment of the deployable headrest airbag 26. The sixth airbag chamber 62 is disposed between the second airbag chamber 48 and the third airbag chamber 50 to protect a frontal bone FB and a nasal bone NB of the vehicle occupant O. The sixth airbag chamber 62 has a curved portion 64 upon deployment of the deployable headrest airbag 26 to protect the frontal bone FB and the nasal bone NB of the vehicle occupant O when the head H moves forward. During deployment of the deployable headrest airbag 26, the fourth airbag chamber 58, the fifth airbag chamber 60, and the sixth airbag chamber 62 fill with air after the first airbag chamber 40, the second airbag chamber 48, and the third airbag chamber 50. If the vehicle seat 18 is reclined, the deployable headrest airbag 26 protects the head H of the vehicle occupant O from going upward if the external force EF is exerted on the rear of the vehicle body 12. Due to its profile (including its curved portion 64), the sixth airbag chamber 62 protects the head H of the vehicle occupant O from moving upward when the external force EF is applied to the rear portion of the vehicle body 12.

Figure 11:
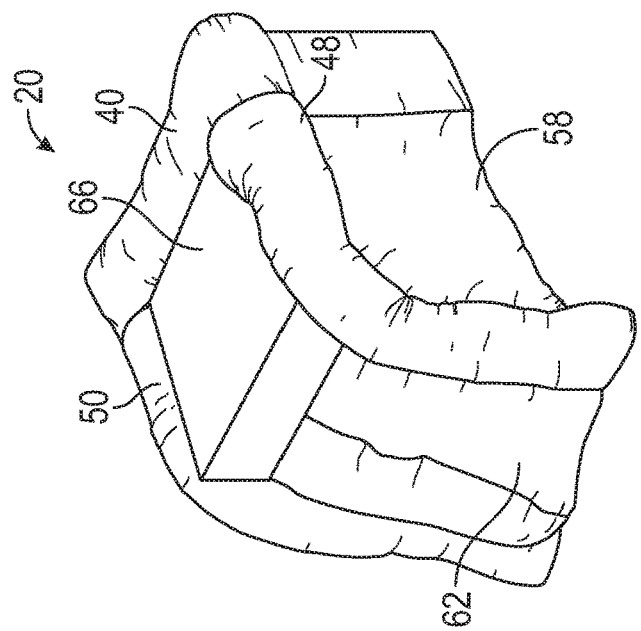
FIG. 11 is a schematic perspective view of the first airbag chamber, the second airbag chamber, the third airbag chamber, a fourth airbag chamber, a fifth airbag chamber, a sixth airbag chamber, and the seventh airbag chamber of the FIG. 9.
Figure 10:
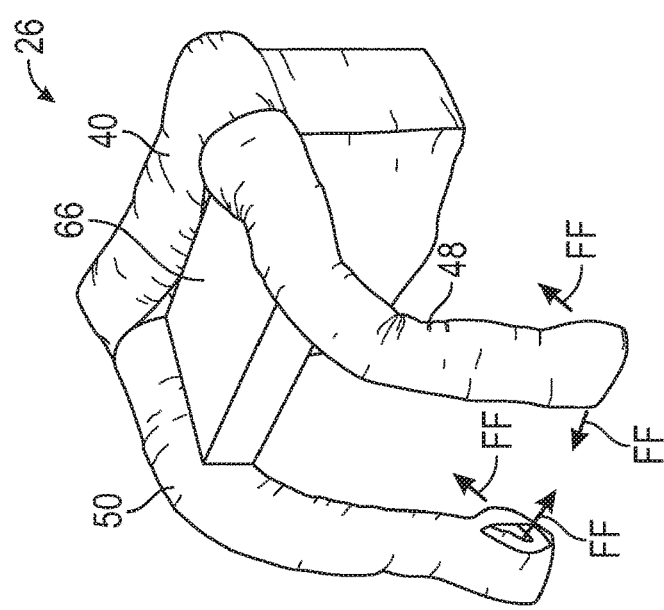
FIG. 10 is a schematic perspective view of the first airbag chamber, the second airbag chamber, the third airbag chamber, and a seventh airbag chamber of the deployable headrest airbag of FIG. 9.
Figure 9:
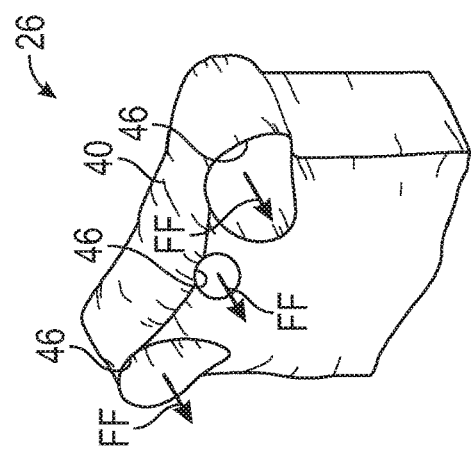
FIG. 9 is a schematic perspective view of a first airbag chamber of another embodiment of the deployable headrest airbag.

With reference to FIGS. 9-11, the deployable headrest airbag 26 further includes a seventh airbag chamber 66 in fluid communication with the first airbag chamber 40 through a top opening 46 to allow fluid flow from the first airbag chamber 40 directly to the seventh airbag chamber 66. The seventh airbag chamber 66 is disposed between the second airbag chamber 48 and the third airbag chamber 50 and between the sixth airbag chamber 62 and the first airbag chamber 40 to protect a parietal bone PB of the vehicle occupant O.

Figure 12:
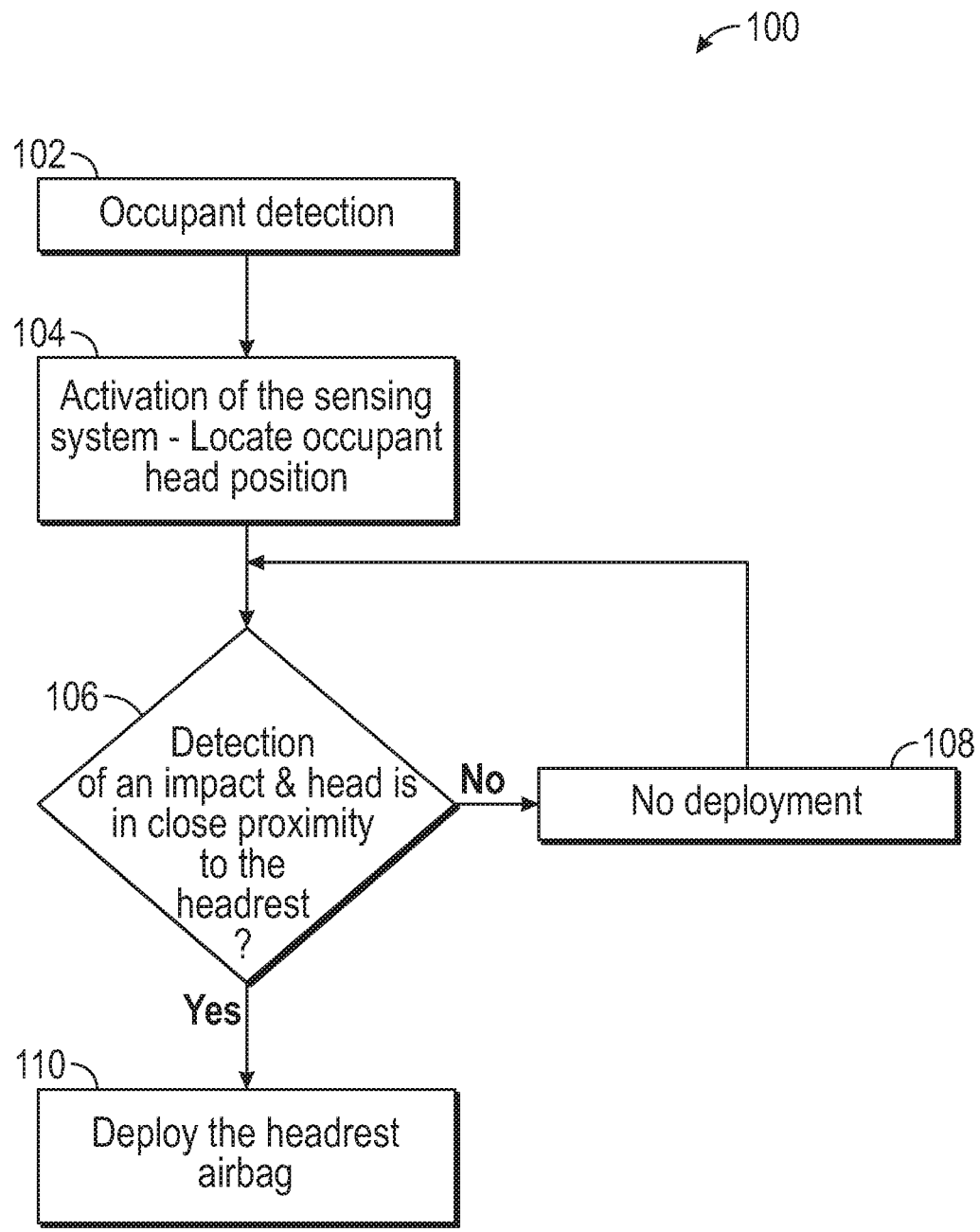
FIG. 12 is a flowchart of a method for controlling the vehicle seat assembly of FIG. 1.

With reference to FIG. 12, the controller 30 is programmed to execute the method 100. The method 100 begins at block 102. At block 102, the controller 30 detects that the vehicle occupant O is seated on the vehicle seat 18 based on signals received from the second sensor 34. Then, the method 100 proceeds to block 104. At block 104, in response to detecting that the vehicle occupant O is seated on the vehicle seat 18, the controller 30 activates the sensing system 36 to locate the position of the head H of the vehicle occupant O with respect to the headrest 24. At this block 104, the sensing system 36 may also detect the position of the headrest 24 with respect to the seatback 22. The controller 30 may also adjust the position of the headrest 24. Then, the method 100 proceeds to block 106. At block 106, the controller 30 determines or detects that the external force EF has been applied to the vehicle body 12. Also at block 106, the controller 30 determines that the head H of the vehicle occupant O is in close proximity to the headrest 24 (i.e., the headrest 24 is in one or more predetermined positions relative to the headrest 24). If the controller 30 determines that either no external force EF has been applied to the vehicle body 12 or that the head H of the vehicle occupant O is not in close proximity to the headrest 24, then the method 100 proceeds to block 108. At block 108, the deployable headrest airbag 26 does not deploy or alternatively a belt system pulls the vehicle occupant O to move the head H to the predetermined head position. If the controller 30 determines that the external force EF has been applied to the vehicle body 12 and that the head H of the vehicle occupant O is in close proximity to the headrest 24, then the method 100 proceeds to block 110. At block 110, the controller 30 commands the deployable headrest airbag 26 to deploy as discussed above.

While the best modes for carrying out the disclosure have been described in detail, those familiar with the art to which this disclosure relates will recognize various alternative designs and embodiments for practicing the disclosure within the scope of the appended claims.

What is claimed is:

1. A deployable headrest airbag, comprising:
    a first airbag chamber configured to be coupled to a headrest of a vehicle seat;
    wherein the first airbag chamber has a stowed position and a deployed position;
    wherein, in the stowed position, the first airbag chamber is disposed inside the headrest; and
    wherein, in the deployed position, the deployable headrest airbag is disposed outside of the headrest to protect a head and a neck of a vehicle occupant;
    wherein, upon deployment of the deployable headrest airbag, the first airbag chamber is positioned adjacent the headrest to protect an occiput of the vehicle occupant
    wherein the deployable headrest airbag further includes a second airbag chamber and a third airbag chamber, the first airbag chamber is in fluid communication with the second airbag chamber and the third airbag chamber to allow fluid flow from the first airbag chamber simultaneously to the second airbag chamber and the third airbag chamber upon deployment of the deployable headrest airbag, and the first airbag chamber is closer to the headrest of the vehicle seat than the second airbag chamber and the third airbag chamber; and
    wherein the deployable headrest airbag further includes a fourth airbag chamber in fluid communication with the second airbag chamber to allow fluid flow from the second airbag chamber directly to the fourth airbag chamber upon deployment of the deployable headrest airbag, each of the second airbag chamber and the third airbag chamber has a curved tubular shape upon deployment of the deployable headrest airbag to move the deployable headrest airbag in a first direction and a second direction upon deployment of the deployable headrest airbag in order to protect the head and the neck of the vehicle occupant, and the first direction is perpendicular to the second direction.

2. The deployable headrest airbag of claim 1, further comprising a fifth airbag chamber in fluid communication with the third airbag chamber to allow fluid flow from the third airbag chamber directly to the fifth airbag chamber upon deployment of the deployable headrest airbag, wherein each of the fourth airbag chamber and the fifth airbag chamber serves as a sidewall of the deployable headrest airbag upon deployment of the deployable headrest airbag to protect a temporal bone of the vehicle occupant.

3. The deployable headrest airbag of claim 2, wherein the fourth airbag chamber is spaced apart from the fifth airbag chamber along a third direction upon deployment of the deployable headrest airbag.

4. The deployable headrest airbag of claim 3, further comprising a sixth airbag chamber in fluid communication with the second airbag chamber and the third airbag chamber to allow fluid flow from the second airbag chamber and the third airbag chamber directly to the sixth airbag chamber upon deployment of the deployable headrest airbag, wherein the sixth airbag chamber is disposed between the second airbag chamber and the third airbag chamber to protect a frontal bone and a nasal bone of the vehicle occupant.

5. The deployable headrest airbag of claim 4, wherein the sixth airbag chamber has a curved portion upon deployment of the deployable headrest airbag to protect the frontal bone and the nasal bone of the vehicle occupant.

6. The deployable headrest airbag of claim 5, further comprising a seventh airbag chamber in fluid communication with the first airbag chamber to allow fluid flow from the first airbag chamber directly to the seventh airbag chamber, wherein the seventh airbag chamber is disposed between the second airbag chamber and the third airbag chamber and between the sixth airbag chamber and the first airbag chamber to protect a parietal bone of the vehicle occupant.

7. A vehicle seat assembly, comprising:
a vehicle seat including a seat base, a seatback coupled to the seat base, and a headrest coupled to the seatback;
a deployable headrest airbag coupled to the headrest, wherein the deployable headrest airbag has a stowed position and a deployed position, wherein, in the stowed position, the deployable headrest airbag is disposed inside the headrest; and
wherein, in the deployed position, the deployable headrest airbag is disposed outside of the headrest to protect a head and a neck of a vehicle occupant;
wherein the deployable headrest airbag includes a first airbag chamber;
wherein, upon deployment of the deployable headrest airbag, the first airbag chamber is positioned adjacent the headrest to protect an occiput of the vehicle occupant;
wherein the deployable headrest airbag includes a second airbag chamber and a third airbag chamber, the first airbag chamber is in fluid communication with the second airbag chamber and the third airbag chamber to allow fluid flow from the first airbag chamber simultaneously to the second airbag chamber and the third airbag chamber upon deployment of the deployable headrest airbag, and the first airbag chamber is closer to the headrest of the vehicle seat than the second airbag chamber and the third airbag chamber; and
wherein the deployable headrest airbag further includes a fourth airbag chamber in fluid communication with the second airbag chamber to allow fluid flow from the second airbag chamber directly to the fourth airbag chamber upon deployment of the deployable headrest airbag, wherein each of the second airbag chamber and the third airbag chamber has a curved tubular shape upon deployment of the deployable headrest airbag to move the deployable headrest airbag in a first direction and a second direction upon deployment of the deployable headrest airbag in order to protect the head and the neck of the vehicle occupant, and the first direction is perpendicular to the second direction.

8. The deployable headrest airbag of claim 7, further comprising a fifth airbag chamber in fluid communication with the third airbag chamber to allow fluid flow from the third airbag chamber directly to the fifth airbag chamber upon deployment of the deployable headrest airbag, wherein each of the fourth airbag chamber and the fifth airbag chamber serves as a sidewall of the deployable headrest airbag upon deployment of the deployable headrest airbag to protect a temporal bone of the vehicle occupant.

9. The deployable headrest airbag of claim 8, wherein the fourth airbag chamber is spaced apart from the fifth airbag chamber along a third direction upon deployment of the deployable headrest airbag.

10. The deployable headrest airbag of claim 9, further comprising a sixth airbag chamber in fluid communication with the second airbag chamber and the third airbag chamber to allow fluid flow from the second airbag chamber and the third airbag chamber directly to the sixth airbag chamber upon deployment of the deployable headrest airbag, wherein the sixth airbag chamber is disposed between the second airbag chamber and the third airbag chamber to protect a frontal bone and a nasal bone of the vehicle occupant.

11. The deployable headrest airbag of claim 10, wherein the sixth airbag chamber has a curved portion upon deployment of the deployable headrest airbag to protect the frontal bone and the nasal bone of the vehicle occupant, wherein the deployable headrest airbag further includes a seventh airbag chamber in fluid communication with the first airbag chamber to allow fluid flow from the first airbag chamber directly to the seventh airbag chamber, wherein the seventh airbag chamber is disposed between the second airbag chamber and the third airbag chamber and between the sixth airbag chamber and the first airbag chamber to protect a parietal bone of the vehicle occupant.

12. A vehicle, comprising:
a vehicle body;
a vehicle floor coupled to the vehicle body, wherein the vehicle body and the vehicle floor collectively define a passenger compartment;
a vehicle seat disposed inside the passenger compartment, wherein the vehicle seat is rotatably coupled to the vehicle floor, and the vehicle seat includes a headrest;
a first sensor coupled to the vehicle body, wherein the first sensor is configured to detect an external force exerted on the vehicle body;
a second sensor coupled to the vehicle seat, wherein the second sensor is configured to determine whether a vehicle occupant is seated on the vehicle seat;
a controller in communication with the first sensor and the second sensor;
a sensing system in communication with the controller, wherein the sensing system is configured to locate a position of a head of the vehicle occupant;
a deployable headrest airbag coupled to the headrest of the vehicle seat, wherein the deployable headrest airbag is configured to deploy from the headrest;
wherein the deployable headrest airbag includes a first airbag chamber positioned adjacent to the headrest;
wherein the deployable headrest airbag further includes a second airbag chamber and a third airbag chamber each in fluid communication with the first airbag chamber to allow fluid flow from the first airbag chamber simultaneously to the second airbag chamber and the third airbag chamber upon deployment of the deployable headrest airbag;
wherein the deployable headrest airbag further includes a fourth airbag chamber in fluid communication with the second airbag chamber to allow fluid flow from the second airbag chamber directly to the fourth airbag chamber upon deployment of the deployable headrest airbag;
wherein the fourth airbag chamber is in direct fluid communication with the second airbag chamber to allow fluid flow from the second airbag chamber directly to the fourth airbag chamber upon deployment of the deployable headrest airbag, wherein the fourth airbag chamber has a curved tubular shape upon deployment of the deployable headrest airbag;
wherein the deployable headrest airbag further includes a fifth airbag chamber in direct fluid communication with the third airbag chamber to allow fluid flow from the third airbag chamber directly to the fifth airbag chamber upon deployment of the deployable headrest airbag;
wherein the deployable headrest airbag further includes a sixth airbag chamber in direct fluid communication with the second airbag chamber and the third airbag chamber to allow fluid flow from the second airbag chamber and the third airbag chamber directly to the sixth airbag chamber upon deployment of the deployable headrest airbag, the sixth airbag chamber is disposed between the second airbag chamber and the third airbag chamber;

wherein the controller is in communication with the deployable headrest airbag;

wherein the controller is programmed to:
- detect that the vehicle occupant is seated on the vehicle seat;
- in response to detecting that the vehicle occupant is seated on the vehicle seat, activate the sensing system to locate the position of the head of the vehicle occupant;
- determine that the head of the vehicle occupant is in a predetermined position relative to the headrest;
- detect that the external force is applied to the vehicle body; and
- in response to determining that the head of the vehicle occupant is in a predetermined position relative to the headrest and detecting that the external force is applied to the vehicle body, command the deployable headrest airbag to deploy.

13. The vehicle of claim 12, wherein the fifth airbag chamber is in fluid communication with the third airbag chamber to allow fluid flow from the third airbag chamber directly to the fifth airbag chamber upon deployment of the deployable headrest airbag, wherein each of the fourth airbag chamber and the fifth airbag chamber serves as a sidewall of the deployable headrest airbag upon deployment of the deployable headrest airbag to protect a temporal bone of the vehicle occupant.

14. The vehicle of claim 13, wherein the sixth airbag chamber is in fluid communication with the second airbag chamber and the third airbag chamber to allow fluid flow from the second airbag chamber and the third airbag chamber directly to the sixth airbag chamber upon deployment of the deployable headrest airbag, wherein the sixth airbag chamber is disposed between the second airbag chamber and the third airbag chamber to protect a frontal bone and a nasal bone of the vehicle occupant.

* * * * *